April 28, 1942.  L. HAMMOND  2,281,284
ALTITUDE DETERMINING MEANS AND METHOD
Filed May 20, 1937
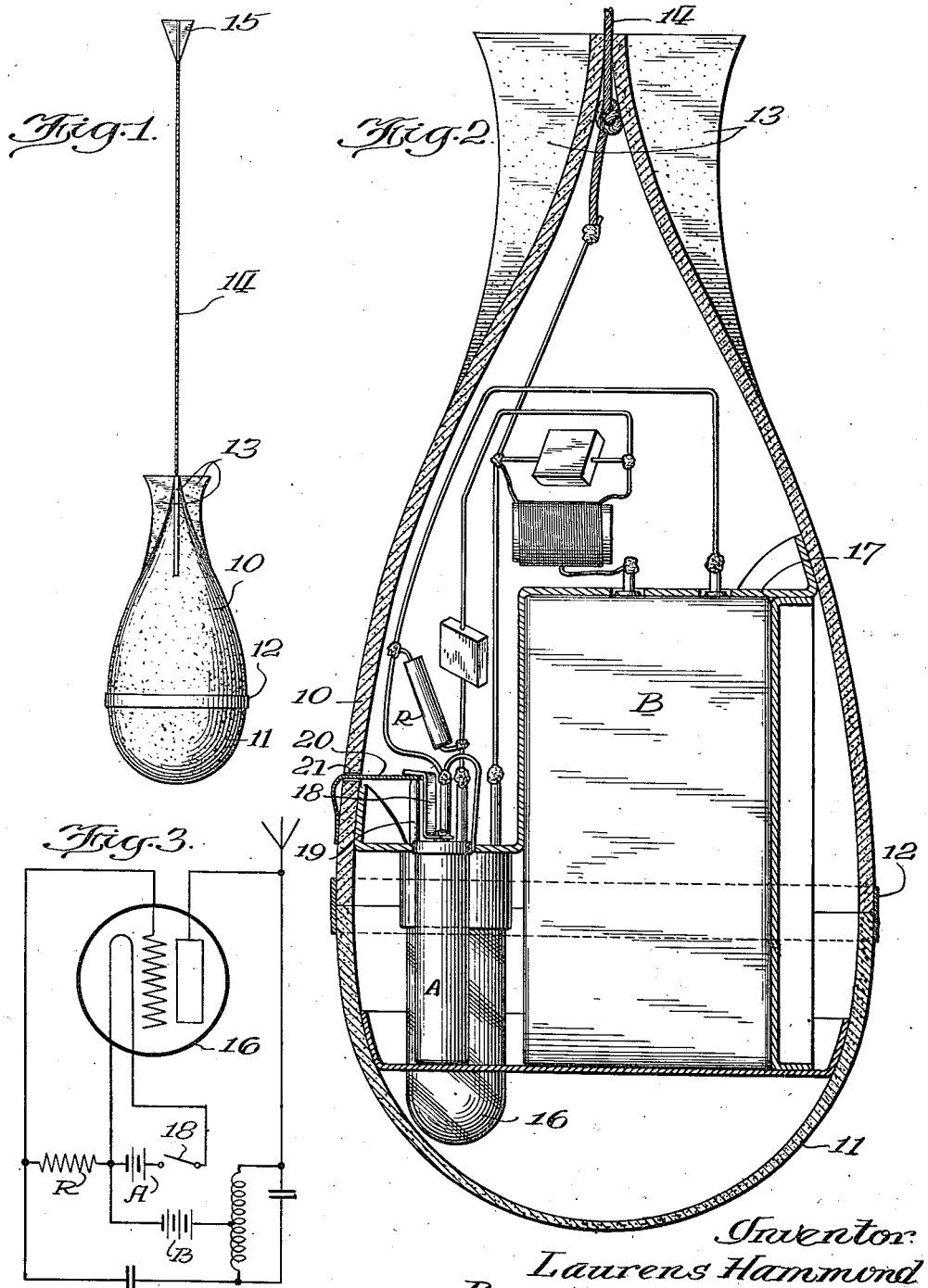
Inventor:
Laurens Hammond
By
Williams, Bradbury, McCaleb & Hinkle
Attys.

Patented Apr. 28, 1942

2,281,284

UNITED STATES PATENT OFFICE 2,281,284

ALTITUDE DETERMINING MEANS AND METHOD

Laurens Hammond, Chicago, Ill.

Application May 20, 1937, Serial No. 143,696

10 Claims. (Cl. 250—1)

My invention relates generally to a method and means for determining altitude above ground level, particularly for use by pilots of airplanes, airships, and the like.

It is an object of my invention to provide an improved means for determining altitude, which is not dependent upon barometric pressure.

A further object is to provide an improved method and means for determining the altitude of an airplane or airship by means of a continuously operating radio frequency oscillator which may be dropped from the plane and which will be rendered inoperative upon striking the ground or water, and in which the time of falling may be determined by the pilot by noting the period during which the signal generated by the falling oscillator may be heard.

In the drawing

Figure 1 is an elevational view of a suitable container for the radio frequency oscillator with the antenna extending therefrom;

Figure 2 is an enlarged sectional view of the oscillator in its housing, and

Figure 3 is a diagram of the radio frequency oscillator.

The oscillator may be of any well known design, the form illustrated in Figure 3 being the well known Hartley oscillator which is preferably tuned for short-wave oscillation at a radio-frequency which will heterodyne with the frequency at which the receiver of the aircraft is usually tuned. It will be understood that in order to produce an audible signal, the radio receiver of the aircraft should be of a type adapted for continuous wave reception, such as one employing a super-heterodyne or a regenerative circuit. The oscillator is mounted in a suitable streamline housing comprising an upper portion 10 and a lower cap 11 which are secured together by a strip of adhesive tape 12. The housing parts 10 and 11 may be formed of any suitable material, preferably frangible and insulating, such as papier-mâché or the like. The upper portion 10 of the housing may be provided with fins 13. The antenna wire 14 extends from the upper end of the housing portion 10 and may have a suitable drag member 15 attached to the end thereof to maintain the antenna wire extended during the falling of the oscillator.

The oscillator comprises a triode vacuum tube 16 which may be secured to a cardboard or paper mounting sheet 17 in any suitable manner. The A-battery and B-battery are likewise suitably mounted within the container formed by the halves 10 and 11. The A-battery has a suitable spring clip 18 secured to one of the terminals thereof, the spring clip 18 being adapted resiliently to press against one of the filament terminal prongs 19 of the tube 16. A strip 20 of cardboard, fiber, or other suitable insulating material, is interposed between the end of the prong 19 and the clip 18. A portion of this strip extends through a suitable slot 21 formed in the casing 10 so that the strip 20 may be pulled therefrom, thus permitting the contact 18 to engage the end of the prong 19 and close the circuit to the filament. The other elements of the oscillator are suitably secured within the housing formed by the upper half 10 and the lower cap 11. Especially the lower cap 11 should be made of relatively fragile material, it being merely necessary that it shall be sufficiently strong to resist the pressure of the air during its downward flight. It should be sufficiently fragile that upon striking the ground or a body of water when dropped from a low elevation, it will be collapsed, and will permit the breakage of the tube 16.

In following the method of my invention, the pilot whose view of the ground is obscured by clouds or darkness, and who is uncertain of his altitude above the ground, will pull the insulating strip 20 from one of the oscillators which will be carried in the plane, and tune the radio receiving apparatus upon his plane to a frequency which will heterodyne with that produced by the oscillator. It will be understood that as soon as the insulating strip 20 is pulled from between the spring contact 18 and the prong 19, the cathode or filament of the tube will be supplied with current from the A-battery, and the oscillator will commence operating. The tube is preferably of a type which commences functioning almost immediately after the current is supplied to the filament.

After the pilot has tuned his receiver to a frequency heterodyning with that generated by the oscillator, he will drop the oscillator from the plane. He will then, preferably by means of a stop watch, time the period during which the heterodyning frequency signal is heard by him. For this purpose the stop watch used to time the fall of the oscillator is preferably calibrated in feet. This is possible because due to the streamlining of the container for the oscillator, its rate of fall will be accurately predictable.

The batteries and other elements of the oscillator are preferably so arranged within the container that the center of gravity of these parts will lie well toward the bottom of the container and in line with the axis thereof. In this way the oscillator will be prevented from tumbling or yawing during its downward flight and thus assure that its rate of fall will be more accurately predeterminable.

The batteries may be very small and cheap since they need to deliver energy for a maximum of but a few minutes. Similarly the other parts of the generator may be of the most simple and cheap construction. One or more of the circuit connections may be made relatively fragile so that when dropped from a low altitude into water, the operation of the oscillator will be stopped even though the tube is not broken.

The apparatus and method herein described will be of particular usefulness on long transoceanic flights, where it will serve as a simple and convenient means for checking the reading of the usual barometric altimeter. It may also be used for military purposes, particularly in bombing operations and practice.

The invention may be embodied in a wide variety of different forms, all coming within the scope of the claims which follow.

I claim:

1. The method of determining the altitude of a body in flight which comprises rendering operative a radio frequency oscillation generator which is sufficiently frangible to be rendered inoperative when subjected to slight shock, detecting the oscillations produced by the generator by means of a radio receiver carried by the body in flight, dropping the generator from the body the altitude of which is to be determined, noting the duration of time during which the generator oscillates from the instant it is dropped from the body to the time it strikes the ground and is thereby rendered inoperative, and from said time of fall determining the altitude of the body.

2. The method of determining the altitude of aircraft and the like which comprises, dropping a shock destroyed frangible radiant electrical oscillation generator from the aircraft, receiving the signal from said generator by a radio receiver on the aircraft, determining the time of fall of the generator from the signal oscillations produced thereby, and calculating the elevation of the air-craft above ground level from the time of fall of said generator.

3. The method of determining the altitude of aircraft equipped with radio receiving apparatus, which comprises causing oscillation of a radio frequency oscillator which is of sufficiently frangible construction to cause it to be rendered inoperative upon striking the earth upon being dropped from a relatively low height, utilizing the receiver of the aircraft to obtain a heterodyning frequency signal from said oscillator, dropping said oscillator from the aircraft, and timing the duration of its fall by the duration of the signal received from said oscillator during its fall to earth.

4. The method of determining the altitude above ground level of an aircraft equipped with a radio receiving apparatus, which comprises generating a radiant wave signal by means of a generator which is sufficiently frangible to be rendered inoperative upon striking the earth after being dropped from a relatively low height, tuning the radio receiving apparatus to detect the signal produced by said generator, dropping the generator from the aircraft to permit it to fall freely until it is rendered inoperative by striking the ground, timing the duration of the fall of the generator by the duration of the signal detected by the radio receiving apparatus, and from the time of fall determining the altitude of the aircraft.

5. The method of determining the altitude of aircraft equipped with a radio receiving apparatus which comprises, rendering operative an oscillation generator having elements rendered inoperative when subjected to sudden shock, by means of said radio receiver obtaining a signal from said generator, releasing said generator from the aircraft, and timing the duration of the signal obtained from said generator during its time of fall, as determined from the time of release to the time that the signal is no longer obtained due to the generator having been rendered inoperative by striking the earth.

6. The method of determining the altitude of an aircraft in flight which is equipped with a radio receiver and a portable radio transmitter-oscillator unit adapted to be released from the aircraft for a free fall to earth, which comprises the steps of causing said unit to transmit a continuous signal oscillation to the receiver, releasing the unit for a free fall to earth, causing the transmission of said signal oscillation to cease upon collision of the unit and the earth, receiving the signal oscillation on the aircraft during the interval of fall of said unit and timing the signal reception over said interval.

7. In an apparatus of the character described for use in determining the altitude of an aircraft carrying a radio receiver, a bomb-like container normally carried on the aircraft but adapted when released to fall freely to the earth's surface and containing a radio frequency transmitting apparatus operable to send a continuous signal for reception by said receiver during the interval of the free fall thereof, means responsive to the collision of the container with the earth's surface to disable the said apparatus and thereby stop reception of the signal on the aircraft, and means for timing the signal reception over said interval.

8. In an apparatus of the character described for use in determining the altitude of an aircraft carrying a radio receiver, a bomb-like container normally carried on the aircraft but adapted when released to fall to the earth's surface and containing a radio frequency transmitting apparatus operable to send a signal for reception by said receiver during the interval of the fall thereof, means responsive to the collision of the container with the earth's surface to disable the said apparatus and thereby stop reception of the signal on the aircraft, and means for timing the signal reception over said interval.

9. The method of determining the altitude of an aircraft in flight which is equipped with a radio receiver and a portable radio transmitter-oscillator unit adapted to be released from the aircraft for a fall to earth, which comprises the steps of causing said unit to transmit a signal oscillation to the receiver, releasing the unit for a fall to earth, causing the transmission of said signal oscillation to cease upon collision of the unit and the earth, receiving the signal oscillation on the aircraft at least during the latter portion of the fall of said unit, and timing the interval between the release of said unit and the cessation of said signal.

10. In an apparatus of the character described for use in determining the altitude of an aircraft carrying a radio receiver, a bomb-like container normally carried on the aircraft but adapted when released to fall to the earth's surface and containing a radio frequency transmitting apparatus operable to send a signal for reception by said receiver at least during the latter portion of the fall of said apparatus, means responsive to the collision of the container with the earth's surface to render said apparatus inoperative and thereby to stop reception of the signal on the aircraft, and means for timing the interval between the release of said transmitting apparatus and the cessation of said signals as received.

LAURENS HAMMOND.